June 9, 1931.  C. A. GLASS  1,808,981
CALCULATING DEVICE
Filed Jan. 31, 1927   2 Sheets-Sheet 1

INVENTOR
Clifton A. Glass.
BY
ATTORNEY

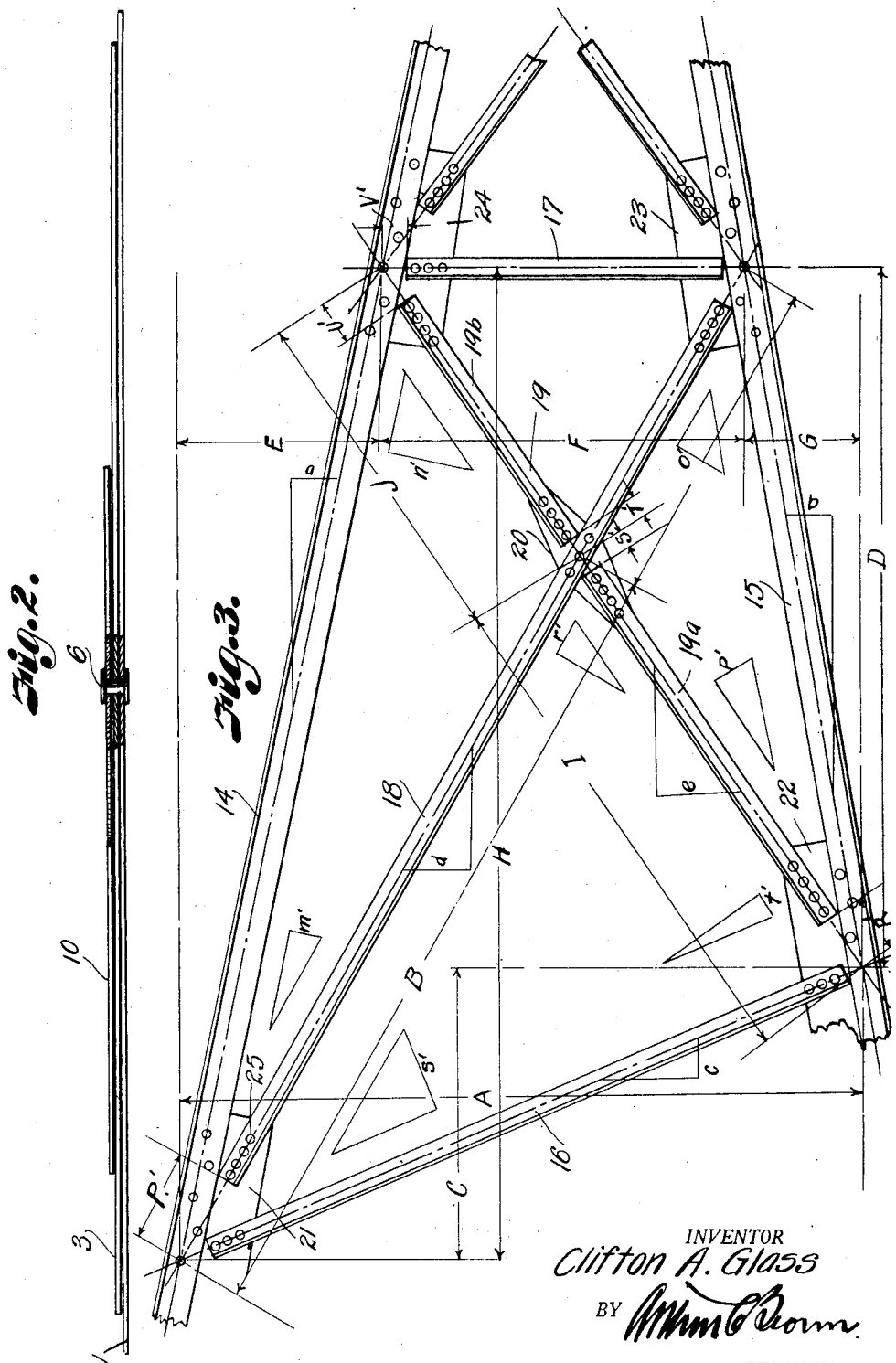

Patented June 9, 1931

1,808,981

UNITED STATES PATENT OFFICE

CLIFTON A. GLASS, OF KANSAS CITY, MISSOURI

CALCULATING DEVICE

Application filed January 31, 1927. Serial No. 164,718.

My invention relates to calculating devices and more particularly to co-operating scales having related graduations for calculating relations of structural members.

Devices of this character heretofore provided have included a single scale member rotatable over a single protractor or field and having scales whereby a single result, usually a distance or dimension, can be obtained at one setting when all angles are known, and usually providing for solving problems including 90° angles between the base members. In the usual methods of laying out structures, angles must be known in terms of their slope and it would be desirable to provide a device capable of adding and subtracting angles in terms of their slope, which is not possible with devices heretofore available. The result is that the values of unknown angles must be calculated laboriously by mathematical processes before such devices can be employed to determine dimensions.

The principal objects of my invention therefore are to provide a device whereby angles may be added and subtracted in terms of their slope, to employ two members in association with a protractor whereby the clearances between the intersecting members of structural frames and the like relations may be calculated from axial line data more expeditiously, conveniently and accurately than by present means, and whereby two or more problems may be solved by one setting of the device.

I offer as my invention a set of co-operating scales comprising a semi-circular scale, a semi-disk and a transparent indicator, the latter two members being independently rotatable on the axis of the semi-circular scale, and graduations and indicia being so provided and disposed that known data may be coordinated by the three members to produce and disclose desired data, as will be more particularly described with reference to the drawings in which:

Fig. 2 is an edge view of my device, illustrating the relation of the co-operating scales to each other.

Fig. 3 is a diagram of a structural frame showing the nature of relations concerning which computations are made by the functioning of my device.

Figure 1:
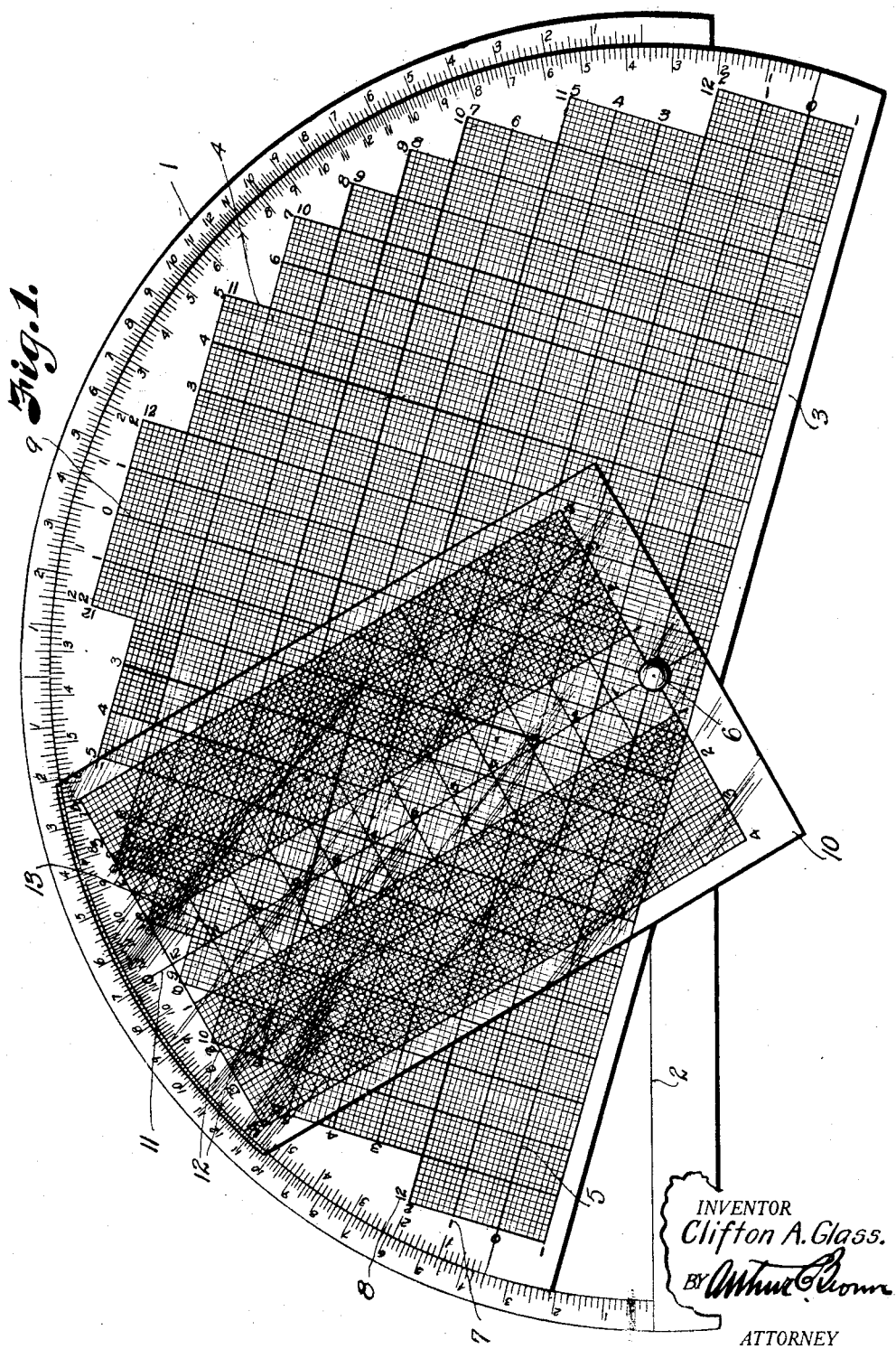
Fig. 1 is a plan view of my device.

Referring more in detail to the drawings:

1 is a protractor arranged to read in terms of inches and fractions on a base of one foot, as is the customary method of designating angles between the axes of intersecting structural members, and having a base line 2. The protractor 1 is semi-circular, and graduations representing sub-divided degrees on the arc thereof are numbered 1 to 12 from the base line or chord to the 45 degree points, and 1 to 12 from the 90 degree or midpoint of the semi-circle in the median line of the protractor to the 45 degree points.

3 designates a similar protractor with a graduated or cross-secting field 4 having a base line or chord 5, the peripheral graduations of which match with the protractor 1, and which may be rotated about a pivot 6 and thus locate the field at the desired angular relation with the base line 2 of the protractor 1. The pivot is located at the centers of the chords of the protractors, and lines perpendicular to the chords and including the centers would form vertical bisectors or median lines of the protractors.

The field 4 is graduated in inches and fractions at any convenient scale, the graduations having identifying numbers reading from the pivotal point 6, the vertical graduations 7 parallel with the median line of the protractor representing the width of a member the axis of which coincides with the base line 5 of the graduated field 4, and the horizontal or transverse graduations 8 parallel with the chord representing the lengths along the axis of such member. However, the median line 9 of the field may serve as the base line in which case the transverse graduations 8 would represent the width of a member.

An indicator 10 pivotally mounted on the pivot 6 has a cross-secting field including a base line and a bisector or median line 11 erected at right angles thereto at the pivot point, and having graduations 12 parallel to and on each side of the median line representing distances from said median line, and graduations 13 along the median line at right angles thereto and representing distances from the common pivotal point 6, the graduations being to the same scale as the field 4 of the protractor 3 and numbered from the median line and base respectively. The indicator may be rotated about the common pivot 6 to a desired angular relation either with the base line 2 of the protractor 1, or with the base line 5 of the field 4, by coincidence of the extended median line 11 with a particular graduation either of the protractor 1 or of the protractor 3.

I will now describe the use of my device in calculating distances and angles of a panel of a structural frame such as represented by Fig. 3, the panel comprising the two primary members 14 and 15, the inclined strut 16 and horizontal strut 17, the continuous diagonal 18 and the spliced diagonal 19 composed of the sections 19a and 19b, the same being so designated as comprising together the diagonal 19.

The connection between the sections 19a and 19b is made by gusset plate 20, and the connections between the other members are made by the gusset plates 21, 22, 23 and 24.

An opportunity for use of the device occurs at a stage in the calculation of distances and angles at which certain data is available. Examples of such available data are indicated on Fig. 3, illustrative known distances being designated by capital letters A, B, C, etc., and illustrative known angles by lower case letters $a, b, c, d, e$, these being instances of axial lengths and angles with respect to base line of structure, and it being understood that all widths of members and partial width of members from axial line to extreme edge, are known also. Illustrative unknown angles which are to be ascertained by use of the device are designated by lower case letters distinguished by the prime mark, and different letters than those designating known angles being selected since there is no constant factor of relationship between the sought angles and the known; said illustrative unknown angles having the designations $m', n', o', p', r', s', t'$. Illustrative unknown distances to be ascertained and as indicated on Fig. 3 are designated by capital letters distinguished by the prime mark, $P', R', S', T', U'$ and $V'$.

Ascertainment of the distance or dimension $P'$ and the value of the angle $m'$, presents a specific and illustrative problem which will serve as an example for indicating the function of the device in the use of its elements. The two problems are stated together because my device solves the two by one operation. The first step is to ascertain the dimension $P'$ involving primary member 14 and secondary 18, for which purpose the protractor 3 is rotated so that its axis 5 makes an angle $a$ with the base line 2 of protractor. The base line 5 in this use represents the axis of primary member 14; and the graduations 7 on the field represent the partial width of primary member 14, it being necessary that secondary member 18 clear the said primary member 14. The indicator 10 is then rotated so that its median line 11 makes an angle $d$ with the base line 2 of protractor 1, said angle $d$ being the inclination of secondary member 18 to the base line of the structure. It is now called to notice that the graduations 12 on the indicator represent, in the present process, the partial width of the secondary member 18. The result now appears, the intersection of the line representing the partial width of the primary member 14 with the line representing the partial width of the secondary member 18 identifying on the scale 13 the distance $P'$. It should be understood that the partial width of member 14 is represented by a line identified by scale 7 and readable for its full length on the field 4, such portion of this line as is below or behind the transparent indicator 10 being readable therethrough; and further that the partial width of secondary member 18 is shown on the face of the indicator 10 by a line identified by scale 12.

I will now call attention to a particularly novel and valuable feature of my device, namely, its ability through its structure to indicate the solution of an angle problem by the same setting that has solved the distance problem. For small structures, the ascertainment of certain assumedly unknown angles, such as $m'$, may not be necessary, but for handling materials for large structures, data on the values of such angles are very desirable. Therefore, I have provided a means of ascertaining the angle associated with the distance sought and found, in the present case being the angle $m'$ associated with the distance $P'$. And I solve the angle $m'$ by the same setting of the device that has solved $P'$, through the fact that the angles of inclination of all members to the base line of the structure are read on the scale of the protractor 1, and the protractor 3 is provided with a duplicate of this protractor scale that registers therewith.

Therefore it occurs that, the elements of the device having been adjusted to disclose $P'$, the median line 11 of the indicator coincides with a point on the scale of protractor 3 that designates the angle $m'$, the instruction being readable because of the transparency of said indicator and its position with reference to the protractor 3.

It is customary in construction calculations to designate angles in terms of their slopes. Tables have been provided and are available from which to make calculations for length of members and their angles of inclination with the base of the structure in terms of their slopes. It is impossible, however, to add or subtract angles in terms of slope mathematically. The device now offered adds and subtracts angles in terms of their slopes, as indicated in the above example, the angle $m'$ being actually obtained by subtracting angle $a$ from angle $d$.

Devices heretofore available for solving distances such as $P'$ require the value of the associated angle, such as $m'$, so that the tedious calculation previously pointed out is necessary to obtain the angle $m'$ before such devices can be employed for disclosing $P'$, a situation particularly baffling with respect to certain angles.

Having determined the distance $P'$, the dimensions of the gusset plate 21 are solved without disturbing the setting of the device by adding the necessary and known distance from the end of the member 18 to the last rivet 25 thereon, to the distance $P'$, the resultant sum being the distance from the intersecting point to said last rivet 25 along the axis of secondary member 18; and then locating such result on scale 13, on the median line of the indicator, then reading through the transparent indicator the ordinates of this point on the field 4. To said ordinates so disclosed is added the necessary edge distance from center line of last rivet to edge of gusset plate.

Other distances and angles are solved in a similar manner.

Attention is called to my use of the two protractors, having registerable graduations, one rotatable on the other, as the basis of my invention, whereby angles expressed in terms of slope may be added and subtracted; and the addition to such feature of co-operating protractors, of a field of graduations on the second and rotatable protractor and of a third element, an indicator, which co-operating with either the first or the second protractor or both of them, may produce a plurality of readings answering respectively questions of angles and of distances.

What I claim and desire to secure by Letters Patent is:

1. A calculating device comprising a semi-circular scale having arcuately-arranged graduations in terms of slope, a semi-disk pivoted on the axis of said scale and having peripheral graduations in terms of slope registerable with the graduations of said scale and right angularly intersecting lines, and a transparent index pivoted on the axis of said scale having longitudinal and transverse graduations cooperating with said lines to identify unknown dimensions and unknown angles.

2. In a calculating device of the character described, a protractor having arcuately-arranged graduations, a graph member having a cross-sectioned field pivotally mounted on the protractor, and a transparent index member provided with a cross-sectioned field and having pivotal mounting on the protractor.

3. A calculating device comprising a protractor having graduations representing angles in terms of slope, a graph member rotatably mounted on the protractor and having a cross-sectional field and graduations representing angles in terms of slope registrable with said graduations of the protractor, and an index scale pivotally mounted on the protractor having a cross-sectioned field including a median line adapted for registry with the graduations of said protractor and with the graduations of said graph member.

4. A calculating device comprising a protractor having graduations representing angles in terms of slope, a graph member rotatably mounted on the protractor having right angularly disposed lines forming a cross-sectioned field and having graduations representing angles in terms of slope registrable with said graduations of the protractor, and an index scale pivotally mounted on the protractor having a median line adapted to register with the graduations of said protractor and with the graduations of said graph member, and having right angularly intersecting lines representing lateral and lineal dimensions adapted to intersect said lines of the cross-sectioned field of the graph member.

5. In a calculating device, a protractor having a base line, a bisector perpendicular to the base line, and a series of arcuately-arranged graduations formed on a circle having the center of the base line as its center and numbered from the bisector and from the base line, a semi-disk comprising a protractor having a diameter forming a base, and a median line perpendicular to the base at the center thereof, said semi-disk being pivoted on the center of the base line of the protractor, and having peripheral graduations registrable with the graduations of said protractor, there being lines parallel with the median line and numbered oppositely therefrom, and lines parallel with the base and numbered oppositely therefrom, and an index pivoted at the center of the base line of the protractor and having a right angularly cross-sectioned field to cooperate with the lines on said semi-disk.

6. A calculating device comprising a protractor having graduations representing angles in terms of slope, a graph member pivoted to the protractor and having graduations representing angles in terms of slope registrable with the graduations of the protractor and having two sets of lines at right angles to each other and a movable transparent index member pivoted to the protractor having a bisector registrable with the graduations of the protractor and a series of graduations parallel with said bisector for intersecting said lines of the graph member for the purposes set forth.

In testimony whereof I affix my signature.

CLIFTON A. GLASS.